United States Patent

Mashimo et al.

[15] 3,678,828

[45] July 25, 1972

[54] EXPOSURE CONTROL DEVICE FOR A CAMERA

[72] Inventors: Yukio Mashimo, Tokyo; Mitsuo Ishikawa, Kawasaki, both of Japan

[73] Assignee: Canon Kabushiki Kaisha, Tokyo, Japan

[22] Filed: Oct. 22, 1970

[21] Appl. No.: 82,874

[30] Foreign Application Priority Data

Oct. 27, 1969 Japan..................................44/85827

[52] U.S. Cl..............................95/11 R, 95/10 C, 95/11.5, 95/53 EB
[51] Int. Cl....................................G03b 17/18, G03b 17/20
[58] Field of Search..............95/11 R, 11.5 R, 10 C, 10 CT, 95/53 E, 53 EA, 53 EB; 315/241 P

[56] References Cited

UNITED STATES PATENTS

| 3,526,177 | 9/1970 | Kiper et al. | 95/53 EA |
| 3,374,718 | 3/1968 | Hochreiter | 95/10 C |
| 3,316,445 | 4/1967 | Ahrons | 315/241 P |
| 3,273,478 | 9/1966 | Kinder | 95/11 R |
| 3,393,620 | 7/1968 | Reiche et al. | 95/11 R |
| 3,418,904 | 12/1968 | Wick et al. | 95/11.5 R |
| 3,424,071 | 1/1969 | Schwahn | 95/11.5 R |

Primary Examiner—Samuel S. Matthews
Assistant Examiner—Robert P. Greiner
Attorney—McGlew and Toren

[57] ABSTRACT

An exposure control device for a camera comprising: an electronic shutter control device for shutter actuation, a brightness indicator circuit for indicating and warning insufficient brightness of an object being photographed, and exposure measuring circuit connectable to said brightness indicator circuit and flash ready indicator for a flash exposure, whereby an indicator in said brightness indicator circuit instructs a camera operator to use a flash device and said flash indicator assures camera operator to get a correct flash exposure.

12 Claims, 5 Drawing Figures

EXPOSURE CONTROL DEVICE FOR A CAMERA

The present invention relates to an indicator device for use in cameras having an electronic shutter, and more particularly to such a device for indicating, preferably within the finder of a camera, whether or not the use of a speed light device is needed, completion of the charging of the speed light device and the range of interlocking of the speed light device.

In the prior art, where it is desired to take pictures by a camera having an electronic shutter with a flash light, the shutter circuit is switched to a flash photographing position, and the photographing is effected upon illumination of a neon lamp indicating the completion of charging of the main capacitor provided in the speed light device. In case of cameras of the type having a flash-auto device in which a proper photographing distance is established and thereby the diaphragm aperture is automatically determined, they often do not have an alarm unit to indicate that the adjustment made is outside the range of interlocking, e.g. an alarm unit for close distance, thereby resulting in an over- or under-exposure to cause inconveniences.

According to the present invention, the voltage across the main capacitor of a speed light device is detected to provide the indication of the completion of charging of the main capacitor as well as an alarm for any setting outside the range of interlocking with the flash-auto device in a convenient manner.

It is a primary object of the present invention to provide a brightness indicator device which instructs an operator to use a speed light device when the amount of light from an object being photographed is below a given level.

It is another object of the present invention to provide an indicator device which indicates the completion of charging of the main capacitor of a speed light device.

It is a further object of the present invention to provide a device for indicating that photographing informations set is outside the range of interlocking of a speed light device.

Above and other objects, features and advantages of the invention will become apparent from the following description with reference to the drawings, in which.

Figure 1:
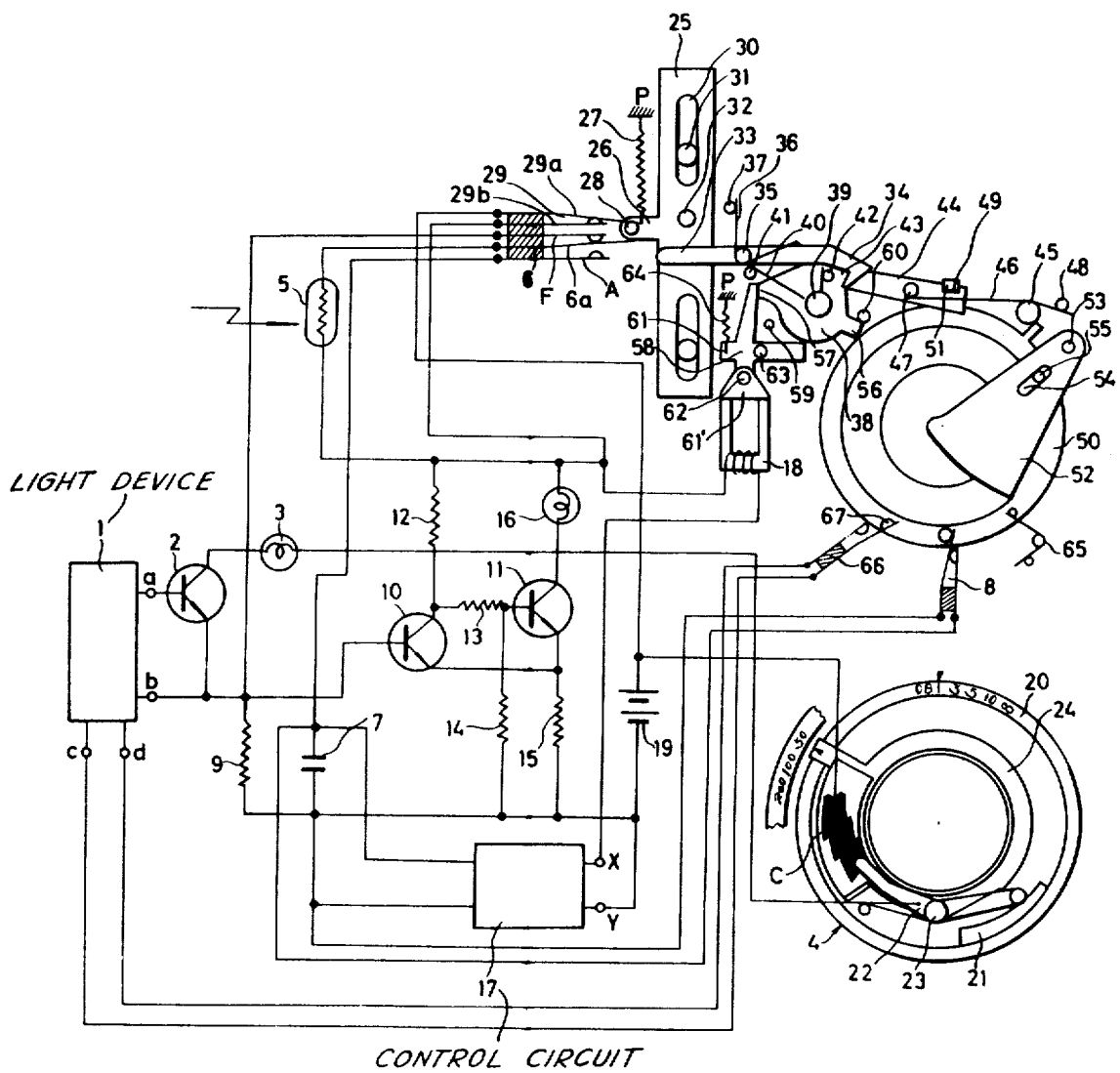
FIG. 1 is a schematic view of a first embodiment of the device according to the present invention, the device being in its position to determine the amount of light from an object being photographed.

Referring to the drawings, reference numeral 1 denotes a speed light device of conventional design which includes a main capacitor (not shown), the voltage across which appears across terminals $a$ and $b$ when such speed light device 1 is mounted on the body of a camera (not shown), one of the terminals $a$ is connected with the base of an n-p-n transistor, while the other terminal $b$ is connected with the emitter of the transistor 2. The collector of the transistor 2 is connected through a lamp 3 and a resistor 4 to a power source 19 to complete a charging completion indicator circuit, the resistor 4 being used to incorporate flash light photographing informations as will be mentioned later. Reference numeral 5 denotes a photoconductor element which is arranged to be connected across the charging completion indicator circuit. Reference numeral 6 denotes a change-over switch between flash light photographing contact E and automatic photographic contact A. The change-over switch 6 is constructed to have its movable contact normally connected with the contact F, but to move the movable contact into connection with the contact A when the shutter lever 25 is depressed. The contact F is connected to an alarm circuit to be described later, while the contact A is connected to a capacitor 7 which constitutes the time constant circuit of the electronic shutter together with the photoconductor element 5.

Reference numeral 8 denotes a start switch which is connected across the capacitor 7 and which is adapted to be moved to its open position simultaneously with the actuation of the shutter mechanism to be described later. Reference numeral 9 denotes a bias resistor for the transistor 2. Reference numerals 10 and 11 denote transistors which together constitute an alarm circuit, in the form of a Schmidt trigger, for example, which is operated by a voltage provided by a bleeder circuit comprising the photoconductor element 5 and the resistor 9. Reference numerals 12, 13, 14 and 15 denote resistors used in this alarm circuit, and 16 a warning lamp which is illuminated when the transistor 11 is on. A block designated by numeral 17 denotes an electronic shutter control circuit connected in parallel with the capacitor 7. Reference numeral 18 denotes an electromagnet which operates by the output of the control circuit 17 to cause closure of the shutter mechanism to be described later. Reference numeral 19 denotes a power switch which is closed when the shutter lever is depressed. Members designated by numerals 20 to 24 together constitute a mechanism for deciding the resistance of the resistor 4. Specifically, numeral 20 denotes a distance setting ring, 21 a cam on the ring 20, 22 denotes a contact which is movable around a pivot 23 in association with the cam 21, and 24 denotes a film sensitivity adjusting ring carrying on its upper surface a base plate having a copper foil C printed thereon. The copper foil C is arranged and shaped in such a way that when the contact 22 moves in association with the setting of the distance on the ring 20, the resistance of the resistor 4 increases in case of a shooting distance below a minimum shooting distance and in case of a shooting distance beyond a maximum shooting distance.

Reference numerals 25 to 66 denote various members used to constitute a shutter mechanism. Specifically, numeral 25 denotes a shutter release lever P which is resiliently urged upward by a spring 27 on end of which is attached to the camera body P and the other end of which is attached to the projection 26 on the lever 25. Reference numeral 28 denotes an insulating dowel disposed on the projection 26 of the shutter release lever 25, the dowel 28 being operable to close the power switch 29 in response to the first stage of depression of the shutter release lever 25 and to change over the switch 26 in response to the second stage of such depression. Thus a movable contact 29a of the power switch 29 is secured to the top side of the dowel 28 so as to be moved into contact with the contact stationary contact 29b to thereby close the power switch 29 when the shutter release lever 25 is depressed. Disposed below the dowel 28 is a movable contact 6a of the change-over switch 6 which is normally in contact with the contact F. At the time when the switch 29 is closed, a suitable spacing is provided between the dowel 28 and the movable contact 6a of the change-over switch 6 so that the switch 6 is switched from the contact F to the contact A at a small interval after the complete closure of the power switch 29. An elongate slot 30 is formed in the shutter release lever 25 for cooperation with a guide member 31 fixed on the camera body F to guide the vertical movement of the shutter release lever 25. Another dowel 32 is formed on the shutter release lever 25 to start the actuation of the shutter concurrently with the change-over of the switch 6 from the contact F to the contact A. A lever 35 having a hook-shaped detent 34 at its forward end is rotatably mounted on the camera body by means of a pivot 35. A spring 36 abutting against a stop 37 urges the lever 33 to rotate clockwise. A crank wheel 38 is rotatably mounted on the camera body by means of a pivot 39 and is urged to rotate clockwise by a spring 40 abutting against pins 41 and 42. A projection 43 formed on the cam wheel 38 engages the hook portion 34 of the lever 33 when the setting of the shutter is effected. A crank shaft 44 is mounted on the pin 42 of the crank wheel 38 and is urged upward by a spring 46 which is wound around a bolt 45 and abuts against pins 47 and 48. The crank shaft 44 is provided with a notch 49 in which engages the interlocking portion 51 of a shutter ring 50. The shutter mechanism includes a plurality of shutter blades, only one being shown by the numeral 52. The shutter blades such as 52 are rotatably carried by pivots 53. As is usual, a guide slot 54 is formed in the shutter blade 52 for cooperation with a guide pin 55 secured to the shutter ring 50, the arrangement being such that as the shutter ring 50 rotates clockwise, the shutter blade 52 rotates counter-clockwise around the pivot 53, thereby opening the shutter. Another projection 56 is formed on the crank wheel 38 and serves to retain the shutter open. A third projection 57 on the crank wheel 38 serves for the positioning, when the setting of the shutter is effected, of a magnet driven member 58 to be described later. A pair of stoppers 59 and 60 are provided to interrupt the rotation of the crank wheel 38. The magnet driven member 58 comprises a cruciform control portion 61 and a magnet attracted portion 61' integrally connected together by a pivot 62. The magnet driven member 58 is pivotally mounted on the camera body P at 63 and is urged to rotate clockwise by a spring 64 with its one end secured to the camera body P. The shutter ring 50 is urged counter-clockwise by a spring 65. The shutter ring 50 has a pin 67 thereon which is arranged to close synchro-contacts 66 when the shutter reaches its fully open position. These contacts are connected with the terminals $c$ and $d$ of the speed light device.

The speed light device according to the present invention operates as follows.

Figure 2:
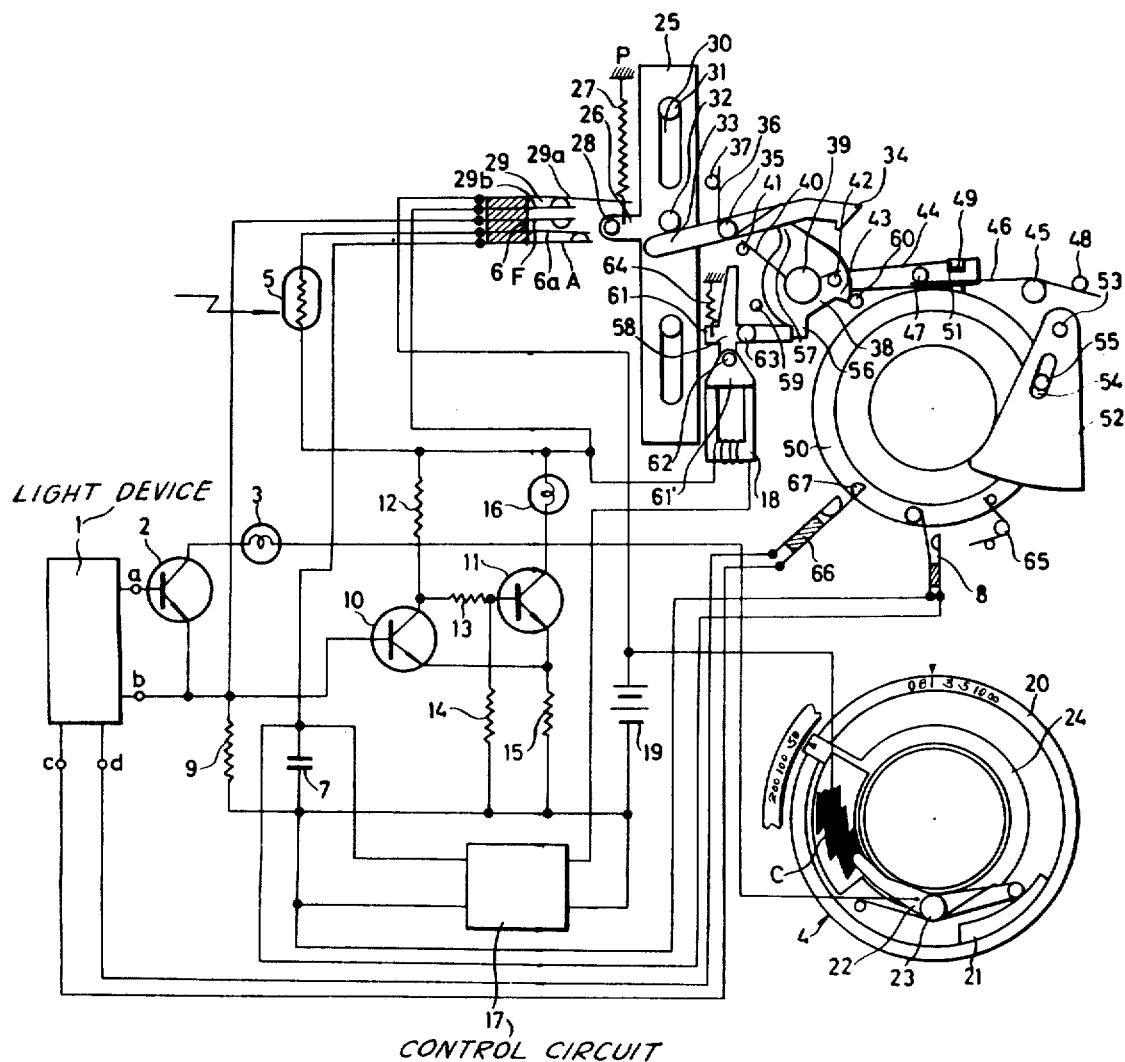
FIG. 2 is a similar view to FIG. 1, but showing the device in its position at the full open of shutter operation.

In response to the first stage of depression of the shutter release lever 25, the power switch 29 is closed, whereby a voltage from the bleeder circuit comprising the photoconductor element 5 and the resistor 9 is applied to the base of the transistor 10. If the amount of light from an object being photographed is sufficiently high, the photoconductor element 5 has a low value of resistance. Hence the voltage applied to the base of the transistor 10 is high enough to cause conduction of this transistor, thereby turning the transistor 11 off. As a result, the warning lamp 16 connected in series with the transistor 11 is not illuminated. If this is the case, the photographer continues the depression of the shutter release lever 25 to its second stage, thereby effecting the change-over of the switch 6 from the contact F to the contact A. Concurrently with the change-over of the switch 6, the dowel 32 on the lever 25 causes a counter-clockwise rotation of the lever 33, thereby releasing the crank wheel 38 from detent by the hook portion 34 of the lever 33 and causing the wheel 38 to rotate clockwise under the action of the spring 40 until it is engaged with and held by the cruciform control portion 61 of the magnet driven member 58 (see FIG. 2). As the crank wheel 38 rotates, the crank shaft 44 starts its crank motion. This allows the shutter ring 50 to rotate clockwise, whereby the guide pin 55 thereon causes the shutter blades 52 to rotate clockwise around their pivots 53, thereby opening the shutter. Simultaneously with the start of rotation of the shutter ring, the start switch 8 is opened, thereby permitting the time constant circuit comprising the photoconductor element 5 and the capacitor 7 to initiate its integrator action. During the time when the time constant circuit is continuing its charging, the shutter control circuit 17 operates to maintain the electromagnet 18 energized, so that the magnet attracted portion 61' is held attracted to cause the mechanism 38, 44 to keep the fully open position of the shutter.

Upon termination of the timing control by the time constant circuits 5 and 7, and the electronic shutter control circuit 17, the electromagnet is deenergized to discontinue its attraction upon the magnet driven member 58 and to release the latter, whereupon the member 58 rotates clockwise about the pivot 63 under the action of the spring 64. This rotation of the member 58 permits the crank wheel 38 to rotate again clockwise until the member 58 engages the stopper 59. Such rotation of the crank wheel 38 is transmitted through the crank shaft 44 to cause a counter-clockwise rotation of the shutter ring 50, thereby closing the shutter blades. After the shutter is once operated to take a picture, it is reset by a counter-clockwise rotation of the crank wheel 38 until the wheel 38 engages the stopper 60, for example, by interlocked motion with a film winding mechanism.

When the amount of light from an object being photographed is small, the photoconductor element 5 has a high value of resistance, so that the voltage input to the transistor 10 of the alarm circuit is insufficient to cause the conduction thereof. As a result, the transistor 11 conducts to illuminate the warning lamp 16. By the illumination of the lamp 16, the operator is advised of the need to mount a speed light device 1 on the camera. The switch in the speed light device 1 turned on to initiate the charging of the main capacitor therein. The completion of charging of the main capacitor in the device 1 is indicated by an indicator lamp in response to a voltage across the terminals $a$ and $b$ which is high enough to cause the conduction of the transistor 2, whereupon the indicator lamp 3 is illuminated. In this manner, an indication as to the completion of charging of the speed light device 1 is transferred into the camera body, preferably to the finder thereof. Then the operator may depress the shutter release lever 25 to its first stage, whereby the power switch 19 is closed. It is to be noted that at this time, the photoconductor element 5 is shunted by the charging completion indicator circuit 2, 3, 4, and that these parallel paths operate selectively. Thus if the camera is spaced close to or at a great distance from an object being photographed, the resistor 4 takes a high value of resistance so that the charging completion indicator circuit 2, 3, 4 cannot operate, but the alarm circuit operates to illuminate the warning lamp 16. When the operator modifies a photographing information, the warning lamp 16 is extinguished and the charging completion indicator lamp 3 is illuminated.

Upon illumination of the lamp 3, the operator further depresses the shutter release lever 25 to its second stage, whereby the switch 6 is switched from the contact F to the contact A and the shutter mechanism operates as mentioned before. When the shutter reaches its fully open position, the pin 67 on the shutter ring 50 operates to close the synchro-contacts 66 to feed a synchro-signal through the terminals $c, d$ to the speed light device 1, which device is then operated for illumination.

Figure 3:
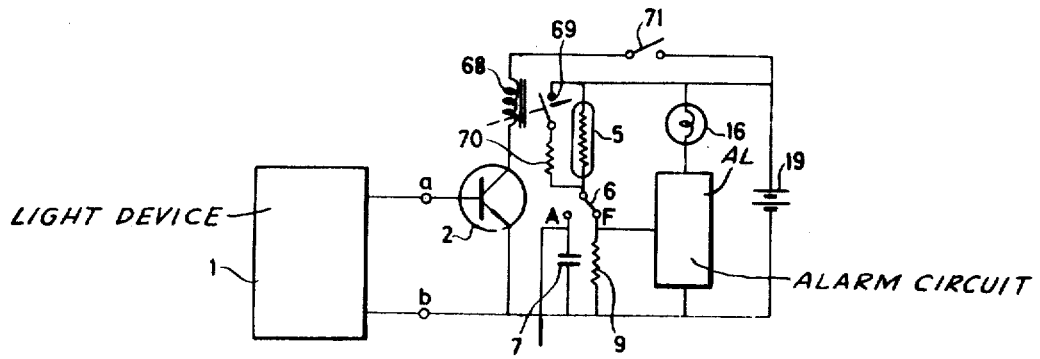
FIG. 3 is a circuit diagram of a second embodiment of the device according to the present invention.

The second embodiment shown in FIG. 3 is similar to the first embodiment just described, except that the charging completion indicator lamp 3 is replaced by an electromagnetic relay comprising an electromagnet 68 having an associated switch 69 which is connected in series with a resistor 70 to shunt the photoconductor element 5 and that the resistor 4 is replaced by a switch 71 which is opened in case of a shooting distance below a minimum shooting distance and in case of a shooting distance beyond a maximum shooting distance. In operation, the voltage across the main capacitor in the speed light device 1 controls the transistor 2, and when this voltage becomes sufficient for illumination of the device 1, the electromagnetic relay 68, 69 is energized to connect the resistor 70 in parallel with the photoconductor element 5 of the electronic shutter circuit, thereby decreasing the resultant resistance to cause illumination of the warning lamp 16 to indicate that the speed light device 1 is ready for illuminating operation. A warning against a setting outside the range of interlocking with the flash-auto device is provided by turning the switch 71 off to extinguish the warning lamp through interlocked motion of the switch 71 with a photographic information setting.

Figure 4:
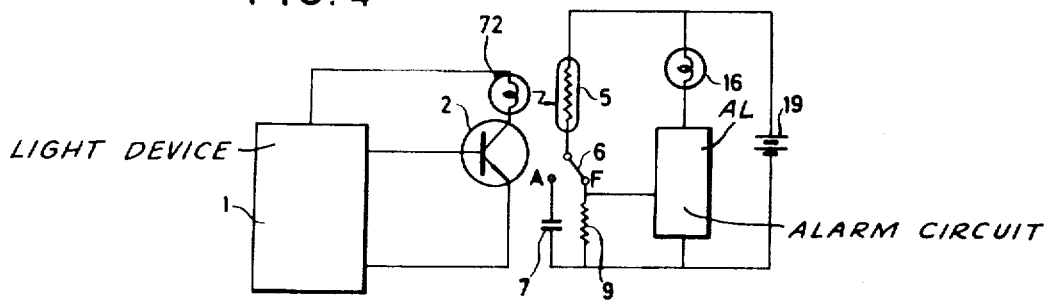
FIG. 4 is a circuit diagram of a third embodiment of the device according to the present invention.

In the third embodiment shown in FIG. 4, the electromagnetic relay shown in FIG. 3 is replaced by a small lamp 72 optically arranged to illuminate the photoconductor element 5 in case when the speed light device with the lamp 72 is clipped on the camera. With this arrangement, the lamp 72 is connected to be fed from the power sources within the speed light device, and when illuminated, the lamp 72 provides additional light input to the element 5 for operating the alarm circuit A1 and the shutter circuit (not shown).

Figure 5:
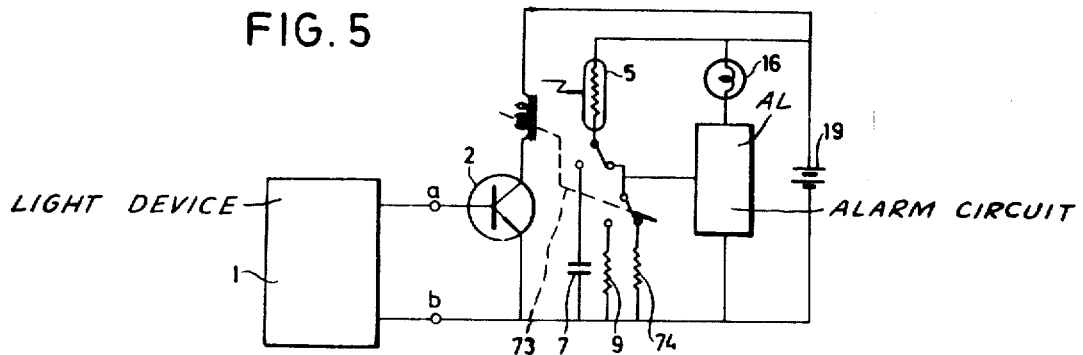
FIG. 5 is a circuit diagram of a fourth embodiment of the device according to the present invention.
Figure 2:
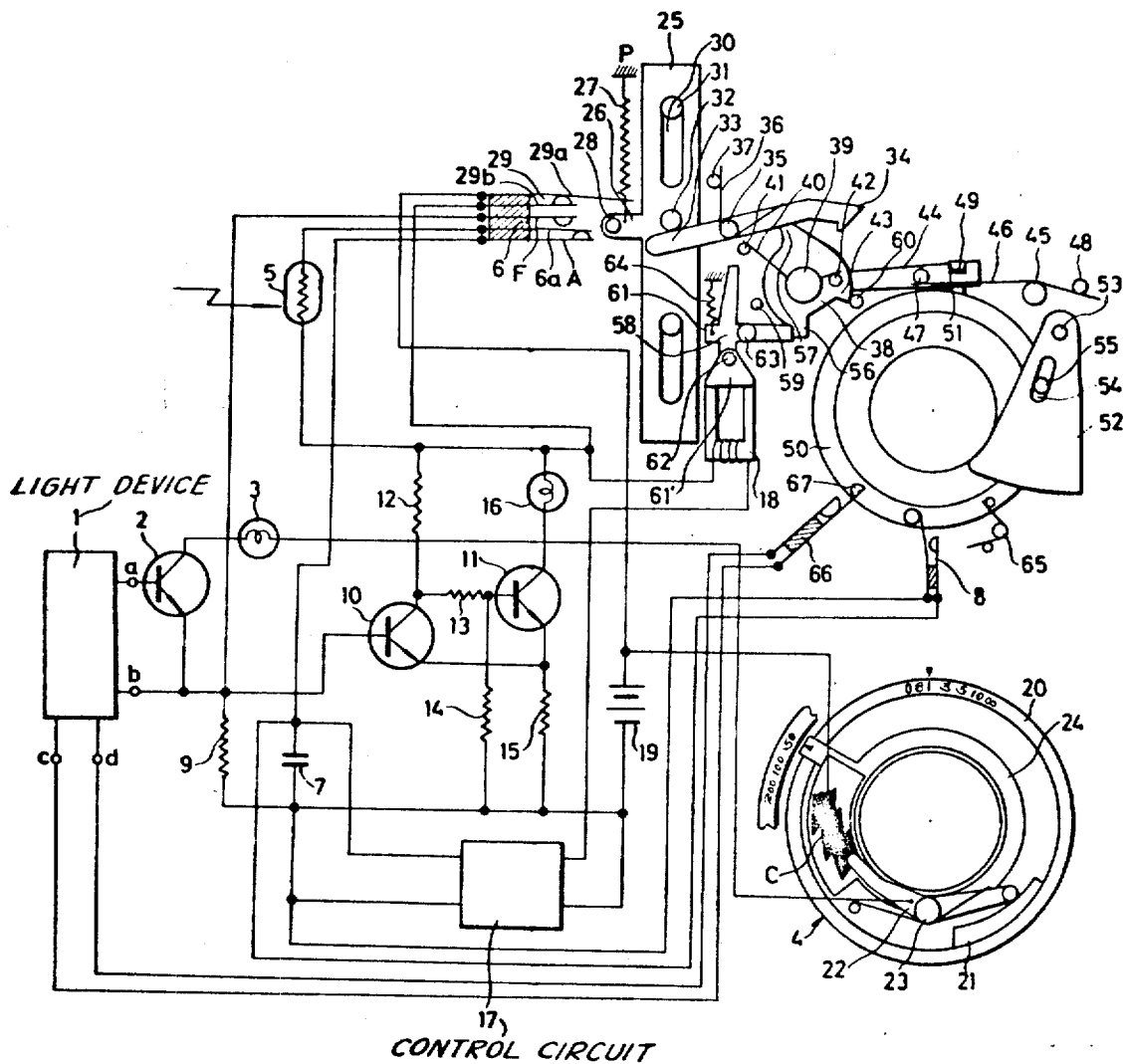
Figure 3:
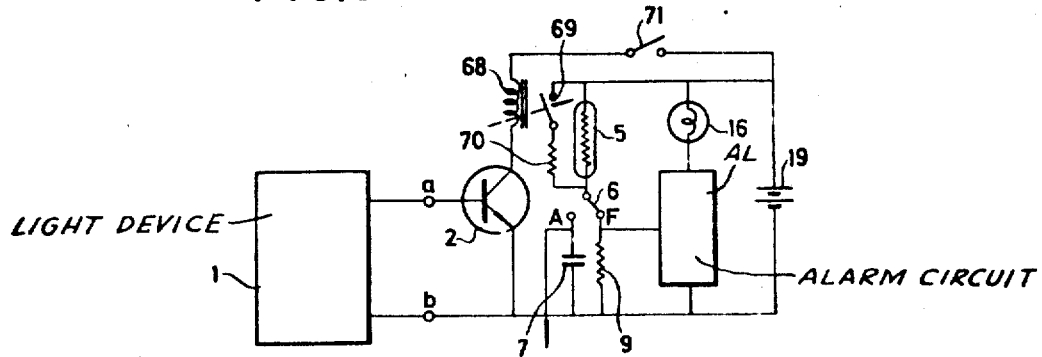
Figure 4:
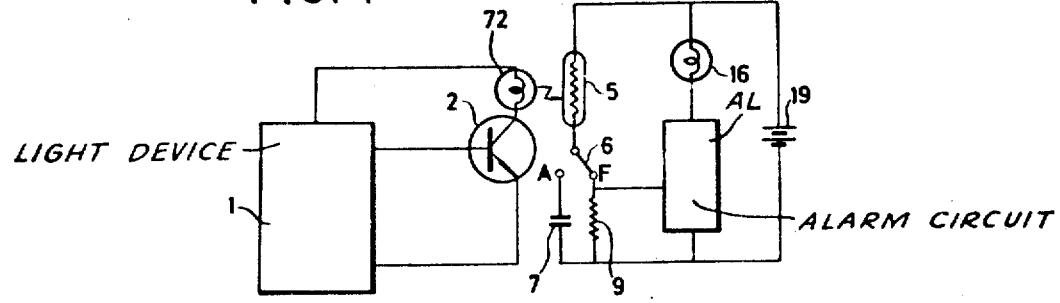
Figure 5:
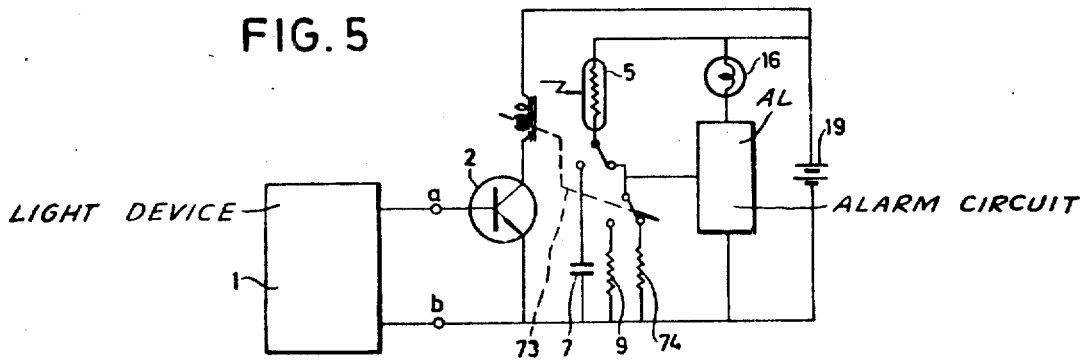

In the fourth embodiment shown in FIG. 5, the output from the speed light device 1 is used to operate an electromagnetic relay which operates onto an element, other than the photoconductor element, of the alarm circuit. In the example shown, the relay operates a change-over switch 73 to connect a resistor 74 of higher resistance than that of the resistor 9 in the circuit in order to indicate that the speed light device is ready for operation by illuminating the warning lamp 16.

From the foregoing, it will be understood that the invention provides an indicator device capable of indicating the ready condition of a speed light device used in taking pictures by flash light and of giving an indication the operable range of the electronic shutter circuit. In addition, by combining these functions in an interlocked device, a warning can be given to indicate that a setting made is outside the range of interlocking when taking pictures by flash light. Moreover, these indicator lamps can be preferably mounted within the finder of a photographic camera to facilitate taking pictures by flash light.

What is claimed is:

1. An apparatus for indicating satisfactory operating conditions for a camera, comprising indicating means for producing indication that distinguish between sufficient and insufficient light, said indicating means including light sensing means and an indicator responsive to said light sensing means, auxiliary light producing means capable of producing auxiliary light, said auxiliary light producing means having a light source, said auxiliary light producing means having actuable and variable power means for energizing said source when said power means reaches a given power state and when said power means is actuated, said power means generating a given electrical value when said power means reaches the given power state, and control means connected to said indicating means for varying the response of said indicating means and rendering said indicating means responsive to the given electrical value.

2. An apparatus, as in claim 1, wherein the camera includes variable settings, and wherein said control means include regulating means responsive to said setting for operating said indicating means in response to said regulating means.

3. An apparatus, as in claim 1, wherein said control means includes a lamp connected to said power means to respond to the indication, said sensing means being exposed to said lamp so as to effect the variation in the response of said indicating means.

4. An apparatus, as in claim 1, wherein said control means includes a magnet responsive to said power means and a switch connected to said sensing means for varying the response of said indicator to said sensing means.

5. An apparatus for indicating satisfactory operating conditions for a camera, comprising a photoconductive member exhibiting varying impedance values in response to variation in the light to which it is exposed, an exposure alarm control circuit having an input circuit connected to said photoconductive means, alarm indicating means connected to respond to said exposure alarm control circuit, said control circuit being actuated by a predetermined actuating level depending upon the impedance of said photoconductive means, an auxiliary light, a power source for said auxiliary light, said power source producing a voltage to indicate readiness to operate said source, a detecting circuit for indicating proper operating conditions of said source, and coupling means in said detecting circuit connected to said input circuit for varying the effective input to a level lower than the actuating level.

6. An apparatus, as in claim 5, wherein said coupling means includes a transistor having a base circuit responsive to said detecting circuit and emitter-collector circuit, a lamp in series with said emitter-collector circuit and positioned to expose said photoconductive member to the light therefrom, said transistor being poled to reduce the impedance of said emitter-collector path in response to an indication from said detecting circuit of proper operating conditions for said source.

7. An apparatus, as in claim 5, wherein said coupling means includes resistance means connected to said input circuit so as to vary the effect of said photoconductive member upon the operation of said input circuit, switch means in series with said resistance means, and electromagnetic means responsive to said indicating means for operating said switch means.

8. An apparatus, as in claim 5, wherein said coupling means includes luminous means optically coupled with said photoconductive member and responsive to said detecting circuit so as to be actuated thereby and reduce the impedance of the photoconductive member.

9. An apparatus, as in claim 5, further comprising setting means for said camera, said detecting circuit including a variable impedance element responsive to said setting means, said setting means being effective to change the focus of said camera, said element being effective to change said detecting circuit to indicate an inoperative condition when said element is moved by said setting means to extreme positions.

10. An apparatus, as in claim 7, wherein said resistance means and said switching means form a series circuit connected parallel to said photoconductive member 11. An apparatus, as in claim 7, wherein said resistance means includes a high resistance element and a low resistance element, said switching means being connected alternately in series with each of said resistance elements in response to said electromagnetic means.

12. An apparatus, as in claim 8, wherein said luminous means comprises an electric lamp serving as an indication member for indicating a proper operating condition for said auxiliary light.

* * * * *

UNITED STATES PATENT OFFICE
CERTIFICATE OF CORRECTION

Patent No. 3,678,828                    Dated  July 25, 1972

Inventor(s) Yukio Mashimo, et. al.

It is certified that error appears in the above-identified patent and that said Letters Patent are hereby corrected as shown below:

In the grant only, insert the attached two sheets of drawing.

Signed and sealed this 8th day of May 1973.

(SEAL)
Attest:

EDWARD M.FLETCHER,JR.              ROBERT GOTTSCHALK
Attesting Officer                  Commissioner of Patents INVENTORS
YUKIO MASHIMO
MITSUO ISHIKAWA
BY
McGlew and Toren
ATTORNEYS